United States Patent
Krämer et al.

(10) Patent No.: US 9,666,314 B2
(45) Date of Patent: May 30, 2017

(54) DEVICE AND METHOD FOR REPAIRING A DAMAGED AREA IN AN UNDERWATER WALL REGION OF A CONTAINER OR TANK

(75) Inventors: Georg Krämer, Wiesenttal (DE); Konrad Meier-Hynek, Hersogenaurach (DE); Lothar Nehr, Hallstadt (DE)

(73) Assignee: AREVA GMBH, Erlangen (DE)

( * ) Notice: Subject to any disclaimer, the term of this patent is extended or adjusted under 35 U.S.C. 154(b) by 740 days.

(21) Appl. No.: 13/484,791

(22) Filed: May 31, 2012

(65) Prior Publication Data

US 2013/0145594 A1 Jun. 13, 2013

(30) Foreign Application Priority Data

Dec. 13, 2011 (DE) .......... 10 2011 088 429
Mar. 28, 2012 (DE) .......... 10 2012 205 013

(51) Int. Cl.
*B23P 6/00* (2006.01)
*G21C 19/20* (2006.01)
*G21C 19/02* (2006.01)
*G21C 19/07* (2006.01)

(52) U.S. Cl.
CPC .......... *G21C 19/207* (2013.01); *G21C 19/02* (2013.01); *G21C 19/07* (2013.01); *Y10T 29/49718* (2015.01); *Y10T 29/52* (2015.01)

(58) Field of Classification Search
CPC ...... G21C 19/207; G21C 19/02; G21C 19/07; Y10T 29/52; Y10T 29/49718
USPC ....... 29/402.01, 402.09, 723, 822, 823, 824; 376/249
See application file for complete search history.

(56) References Cited

U.S. PATENT DOCUMENTS

| 4,822,554 | A | * | 4/1989 | Wood et al. | .......... 376/261 |
| 6,494,307 | B1 | * | 12/2002 | Kozak et al. | .......... 198/465.1 |
| 7,905,017 | B2 | | 3/2011 | Guironnet et al. | |
| 8,371,025 | B2 | | 2/2013 | Krämer et al. | |

(Continued)

FOREIGN PATENT DOCUMENTS

| DE | 100 26 649 A1 | 12/2001 |
| DE | 10 2008 014 544 A1 | 9/2009 |
| FR | 2932602 A1 * | 12/2009 |

(Continued)

OTHER PUBLICATIONS

Buchot et al, FR2932602, Dec. 2009, Machine Translation.*

*Primary Examiner* — Jacob Cigna
*Assistant Examiner* — Lee A Holly
(74) *Attorney, Agent, or Firm* — Laurence A. Greenberg; Werner H. Stemer; Ralph E. Locher

(57) ABSTRACT

A device of repairing a damaged area in an underwater wall region of a container or tank, in particular in the wall region of a tank of a nuclear reactor installation. The device has a guide system that can be mounted along a side wall, at a distance therefrom, and can be secured thereto. At least one first carriage is fitted onto the track of the guide system and movable in a longitudinal direction of the guide system. On the carriage there is displaceably mounted a receptacle for a repair overlay, which can be applied with an adhesive surface to the wall region containing the damaged area. At least one suction mount that is connected to a suction line is disposed on the first carriage and can be suctioned to the side wall.

8 Claims, 3 Drawing Sheets

(56) References Cited

U.S. PATENT DOCUMENTS

2010/0095748 A1 4/2010 Kim
2010/0192368 A1* 8/2010 Kr mer et al. .................. 29/824

FOREIGN PATENT DOCUMENTS

| JP | H07181286 A | 7/1995 |
|----|-------------|---------|
| JP | H1179019 A | 3/1999 |
| JP | 2003156586 A | 5/2003 |
| JP | 2005337884 A | 12/2005 |
| JP | 2008051650 A | 3/2008 |
| JP | 2009510466 A | 3/2009 |
| JP | 2009524802 A | 7/2009 |
| JP | 2011514529 A | 5/2011 |

* cited by examiner

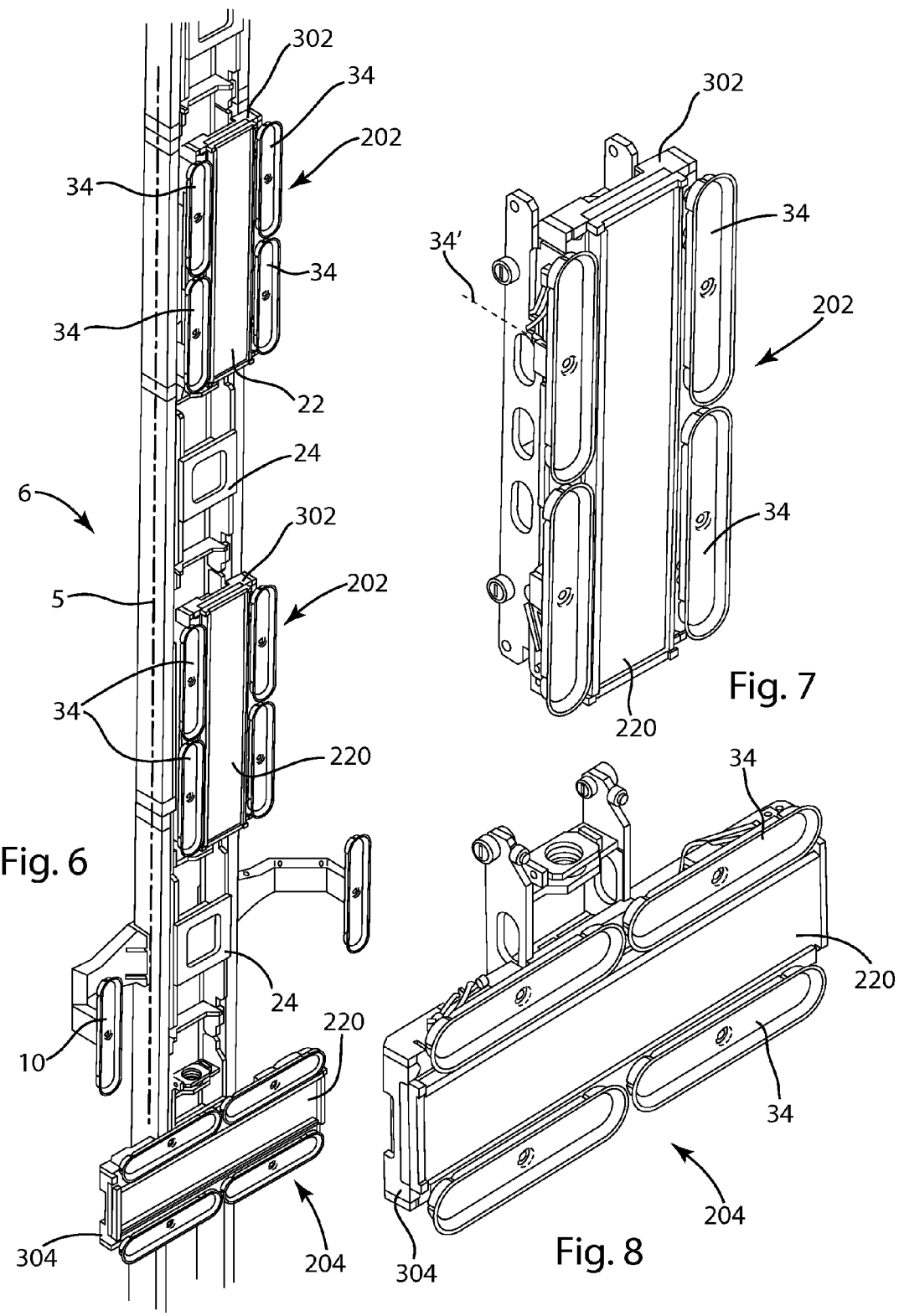

DEVICE AND METHOD FOR REPAIRING A DAMAGED AREA IN AN UNDERWATER WALL REGION OF A CONTAINER OR TANK

CROSS-REFERENCE TO RELATED APPLICATION

This application claims the priority, under 35 U.S.C. §119, of German patent application DE 10 2011 088 429.7, filed Dec. 13, 2011 and German patent application DE 10 2012 205 013.2, filed Mar. 28, 2012; the prior applications are herewith incorporated by reference in their entirety.

BACKGROUND OF THE INVENTION

Field of the Invention

The invention relates to a device for repairing a damaged area in an underwater wall region of a container or tank, in particular in the wall region of a tank of a nuclear reactor installation such as is described, for example, in our commonly assigned U.S. Patent Application Publication US 2010/0192368 A1 and its corresponding German published patent application DE 10 2008 014 544 A1. Furthermore, the invention relates to a method for repairing such a damaged area.

The wall surfaces (side walls and bottom surface) of water-flooded tanks of a nuclear reactor installation, for example the reactor pit or the fuel assembly storage tank, are provided with a liner made of steel plates welded to one another. The welds by means of which the steel plates are welded to one another or to a substructure are vulnerable to chlorine-induced stress crack corrosion as a result of mechanical stresses which inevitably occur during welding, with the result that cracks can occur over time. In order to prevent tank water from escaping into the concrete wall through such cracks, the cracks have to be sealed. In order to ensure sufficient shielding of the maintenance staff against radioactive radiation during such a repair, the water cannot be drained, in particular in the fuel assembly storage tank which is loaded with fuel assemblies, and therefore the repair has to take place under water. However, in such a fuel element storage tank in particular the side wall regions are not easily accessible since only a narrow gap is available between the fuel assembly storage rack, located in the fuel assembly storage tank, and the side walls.

In principle, it is known, for example from the commonly assigned German patent application DE 100 26 649 A1, to close off such cracks by applying an adhesive or by adhesively bonding repair overlays onto them. For this purpose, the repair overlay was applied to the wall either manually by a diver or using a linkage system operated from the edge of the tank. However, in this way, it is not possible to repair damaged areas which are not easily accessible and are located at great depth underneath the water surface.

In order to be able to repair even areas which are not easily accessible, our US 2010/0192368 A1 and DE 10 2008 014 544 A1 propose to arrange a guide system along a side wall, at a spacing distance therefrom, which guide system is secured to the side wall using suction cups and serves to guide a carriage which can be moved in a longitudinal direction of the guide system. A displaceably mounted receptacle for a repair overlay which can be applied with an adhesive surface to the wall region which contains the damaged area is arranged on the carriage. In this known device, the carriage is moved under its own weight into an end position in which the guide system is secured to the side wall with a particularly strong adhesive force using a plurality of suction cups in order to be able to absorb the opposing force which occurs when the repair overlay is pressed on. With the known device it is possible to reach side wall regions and edge regions at the bottom surface adjoining the side wall regions which are accessible only via a narrow gap due to fixtures located inside the tank, for example the fuel assembly storage rack of a fuel assembly storage tank.

Owing to the relatively long curing time of the adhesive which is used, which amounts to at least twelve hours, using the known devices to repair extensive damaged areas, which may extend, for example, over the entire length of a vertically running weld seam, involves a large amount of expenditure in terms of time.

SUMMARY OF THE INVENTION

It is accordingly an object of the invention to provide a device and a method for repairing a damaged area which overcome the above-mentioned disadvantages of the heretofore-known devices and methods of this general type and which provides for a device for repairing a damaged area in an underwater wall region of a container or tank, in particular in the wall region of a tank of a nuclear reactor installation, with which it is possible to repair a multiplicity of damaged areas which are not easily accessible or extensive, relatively large damaged areas with lower expenditure in terms of time. Furthermore, the invention is based on the object of specifying a method with which vertically extending weld seams can be quickly repaired over a relatively large longitudinal section.

With the foregoing and other objects in view there is provided, in accordance with the invention, a device for repairing a damaged area of an underwater wall region of a container or tank, in particular a device for repairing a wall region of a tank in a nuclear reactor installation. The device comprises:

a guide system to be mounted along a side wall, at a spacing distance from, and secured to, the side wall;

at least one first carriage guided on the guide system, and movable in a longitudinal direction of the guide system;

a receptacle displaceably mounted on the at least one first carriage, the receptacle being configured for holding a repair overlay to be applied with an adhesive surface to the wall region having the damaged area; and at least one suction mount disposed on the first carriage and configured for placement against the side wall and connected to a suction line.

In other words, the first-mentioned object is achieved, according to the invention, with a device that contains a guide system which can be mounted along a side wall, at a distance therefrom, and can be secured thereto. The guide system has at least one first carriage which is guided thereon, can be moved in a longitudinal direction of the guide system and on which a receptacle, which is mounted so as to be displaceable perpendicularly with respect to this longitudinal direction, for a repair overlay, which can be applied with an adhesive surface to the wall region containing the damaged area, is arranged, wherein at least one suction mount, which can be placed against the side wall and is connected to a suction line, is arranged on the first carriage.

By using a carriage which can be fitted onto the track of the guide system secured to the side wall and can be moved in the longitudinal direction of the guide rail, for the purpose of transporting the repair overlay to the damaged area it is possible to move a repair overlay provided with a viscous, free-flowing adhesive to the correct working position in a very short time since this has been previously defined by the mounting of the guide system. In other words: the mounting and positioning of the guide system can be carried out with a high level of precision and without time pressure since the repair overlay which is provided with the adhesive is not transported to the damaged area until the guide system has been installed.

Since the first carriage itself is provided with at least one suction mount, the opposing force arising when the repair overlay is applied to the side wall can always be absorbed directly at the location of the carriage so that virtually no forces which are directed transversely with respect to its longitudinal direction and away from the side wall are applied to the guide system by pressing on the repair overlay. In this way, the first carriage can be stopped flexibly at different positions of the guide system and secured to the side wall without particular additional measures being required at these positions in order to securely fix the guide system to the wall, as is necessary in the device known from our above-mentioned US 2010/0192368 A1 and DE 10 2008 014 544 A1. As a result, a plurality of damaged areas at different longitudinal positions with respect to the secured guide system can be successively repaired without the guide system having to be repositioned.

In one advantageous embodiment, the device comprises at least two first carriages and at least one second carriage which can be moved along the guide system and serves exclusively as a space keeper between first carriages which are adjacent to one another.

Furthermore, if the distance between the repair overlays, which is brought about by the second carriage, corresponds approximately to the extent of a repair overlay in the longitudinal direction or is only slightly larger, in a second working step the non-covered gaps which are present between the individual repair overlays after the first step can be closed by using the same first and second carriages.

If the first and second carriages are driveless and can be moved exclusively by the effect of gravity, the design of the device is significantly simplified.

The assembly of the guide system in situ is facilitated if it is composed of sections which are detachably connected to one another.

A particularly simple way of mounting the guide system on the side wall is possible if suction mounts which are connected to a suction line are arranged thereon.

With the above and other objects in view is provided, in accordance with the invention, a method of repairing a damaged area of an underwater wall region of a container or tank, and particularly for repairing a wall region of a tank in a nuclear reactor installation. The method utilizes a device as summarized above and comprises the following steps:

in a first working cycle, alternately fitting a multiplicity of first carriages equipped with repair overlays and second carriages onto the track of the guide system and bonding the repair overlays; and in a second working cycle, fitting the first carriages, again equipped with repair overlays, and the second carriages onto the track of the guide system in a reversed order relative to an order in the first working cycle.

In other words, the second above-mentioned object is achieved in that, in a first working cycle, a multiplicity of first carriages that are equipped with repair overlays and second carriages, are alternately fitted onto the track of the guide system, and the repair overlays are bonded on. In a second working cycle, the first carriages, which have been equipped with repair overlays, and the second carriages are fitted onto the track of the guide system in a reversed order.

In this way, a weld seam can be completely sealed over a long distance in only two working cycles.

Other features which are considered as characteristic for the invention are set forth in the appended claims.

Although the invention is illustrated and described herein as embodied in a device and method for repairing a damaged area in an underwater wall region of a container or tank, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 6 shows a perspective plan view of a guide system which is provided for use in a planar wall region, having a multiplicity of first carriages that are fitted on the track thereof and each hold a repair overlay, likewise in a schematic illustration; and FIG. 7 is a perspective illustration of a first carriage for the repair of a vertically running weld seam; and FIG. 8 is a perspective illustration of a first carriage for the repair of a horizontally running weld seam.

DETAILED DESCRIPTION OF THE INVENTION

Figure 1:
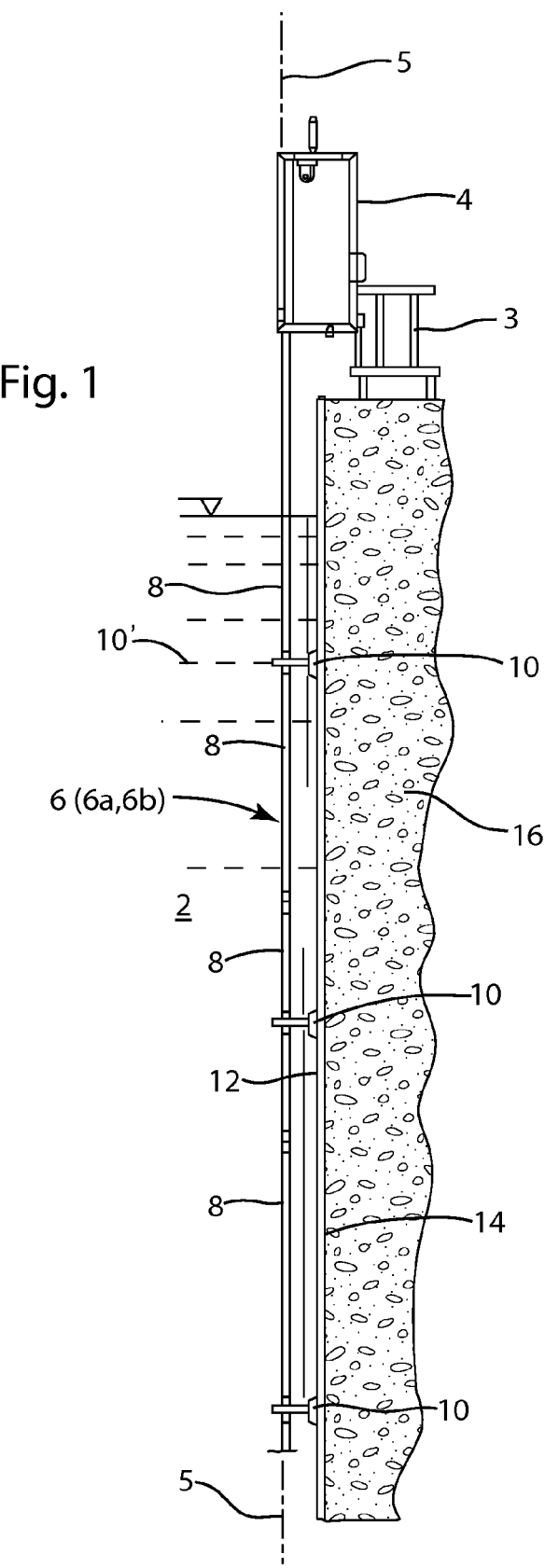
FIG. 1 is a schematic side view showing a guide system of a device according to the invention which is arranged on the side wall of a fuel assembly storage tank.

Referring now to the figures of the drawing in detail and first, particularly, to FIG. 1 thereof, there is shown a device according to the invention in a home position without first and second carriages in a water-flooded tank 2 of a nuclear power installation. The device comprises a supporting frame 4, held in a rack 3 positioned at the edge of the tank, for a guide system 6 which extends in a longitudinal direction 5, is constructed from two parallel guide rails 6a, b and is respectively composed of a multiplicity of sections 8 which are detachably connected to one another. A multiplicity of suction mounts 10 is arranged on the guide system 6 or on the guide rails 6a, b. It is possible to apply a partial vacuum to the suction mounts 10 via a suction line 10', which is only schematically indicated.

The suction mounts thus secure the guide system 6 vertically to a side wall 12 while being spaced apart therefrom at a spacing distance. In the example, the side wall 12 runs vertically. The wall surfaces (side walls 12 and bottom surface) of the tank 2 are provided with a liner 14 that is composed of steel panels welded to one another.

In the illustrated example, the guide system 6 is arranged opposite a vertically running weld seam (not illustrated in FIG. 1) and extends as far as the bottom (likewise not illustrated) of the tank 2. The weld seam can have a multiplicity of damaged areas, with the result that it has to be sealed over its entire length in order to prevent tank water from penetrating the concrete wall 16.

Figure 2:
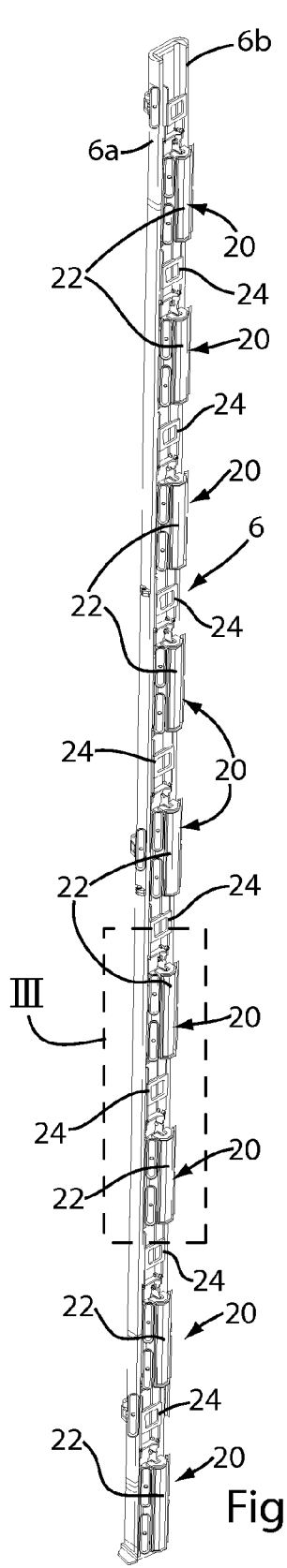
FIG. 2 is a schematic illustration showing a perspective plan view of a guide system provided for use in a corner region, having a plurality of first carriages fitted on the track thereof and each holding a repair overlay.

FIG. 2 shows that the guide system 6 is constructed from two guide rails 6a, b. The guide system 6 guides a multiplicity of first carriages 20 which are fitted onto the track thereof and each support a repair overlay 22. Between adjacent first carriages 20 there is in each case a second carriage 24 which serves as a space keeper and has approximately the same extent in the longitudinal direction 5 as the repair overlay 22. The first and second carriages 20, 24 are alternately fitted onto the track of the guide system 6 and moved downward with a cable winch on the supporting frame 4, exclusively under their own weight, i.e. as a result of the effect of gravity, wherein the carriages 20, 24 each form a stop for the next following carriage 24, 20.

The device according to the invention is illustrated by way of example in more detail in FIGS. 2 to 5 on the basis of an embodiment which is provided for repairing a weld seam located in the corner region of a tank. This becomes clearer from the enlarged illustration according to FIG. 3.

Every first carriage 20 has a receptacle 30 which is mounted on the first carriage 20 so as to be displaceable transversely with respect to the longitudinal direction 5 of the guide system 6, in an advancing direction 32 which is indicated by an arrow, and which holds the repair overlay 22.

The receptacle 30 which is arranged on the first carriage 20 corresponds in its design substantially to the receptacle known from our above-mentioned US 2010/0192368 A1 and DE 10 2008 014 544 A1. As in the known device, the repair overlay 22 is secured in the receptacle 30 by generating a partial vacuum acting on a rear side facing away from the adhesive surface. This measure permits simple release or detachment of the repair overlay 22 when it is permanently secured to the wall after the adhesive has cured. In order to achieve sufficiently high pressing forces, the receptacle 30 is mounted so as to be pneumatically displaceable in the advancing direction 32 on the first carriage 20.

However, in contrast with the embodiments explained in more detail in US 2010/0192368 A1 and DE 10 2008 014 544 A1, according to the invention the first carriage 20 itself is provided with a multiplicity of suction mounts 34 which can be placed against a side wall of the tank and which are connected to a suction line 34'.

For use in the corner region, an angular profile, which is arranged on the correspondingly shaped receptacle 30, is provided as a repair overlay 22. The guide system 6 and the first carriages 20 are provided with suction mounts 10 and 34, respectively, which are oriented in pairs at 90° with respect to one another and with which the guide system 6 and respectively the first carriages 20 can be secured to two side walls which adjoin one another at a right angle.

Figure 5:
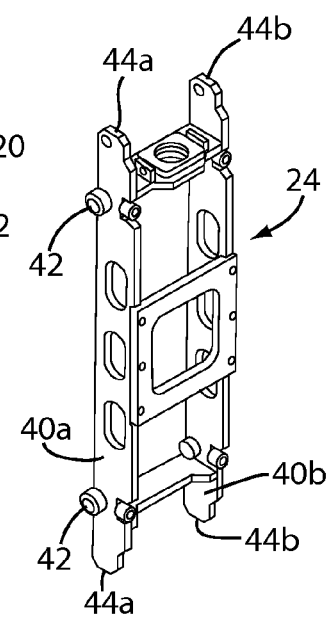
FIGS. 4 and 5 each show a perspective illustration of a first or respectively second carriage.
Figure 4:
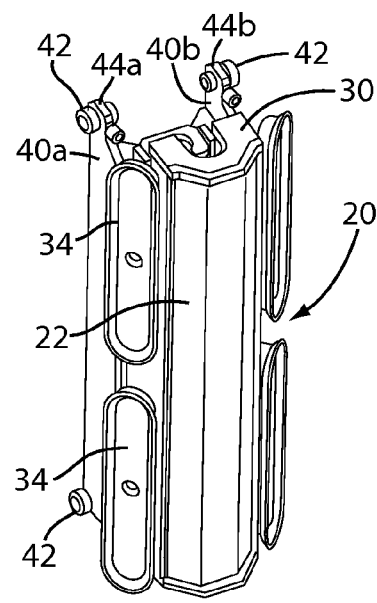

According to FIGS. 4 and 5, first and second carriages 20, 24 each have two runners 40a, b on which lateral rollers 42, with which the carriages 20, 24 roll along the guide rails 6a, b, are arranged.

Figure 3:
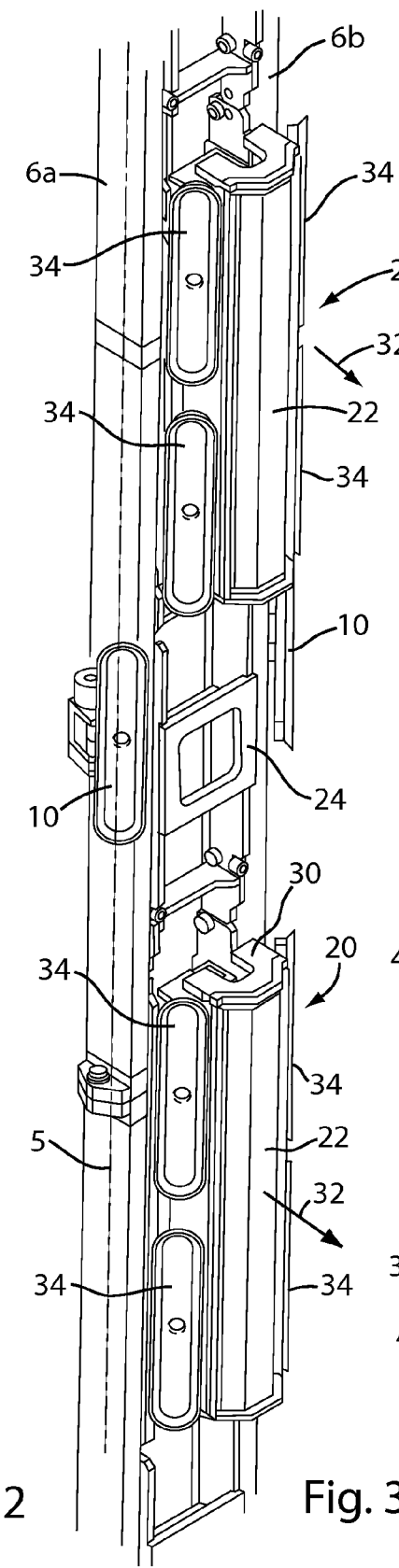
FIG. 3 shows an enlarged illustration of a portion III of the guide system illustrated in FIG. 2.

The narrow end faces 44a, b at the ends of the runners 40a, b each serve as a stop face for the carriage which is respectively adjacent in the stack, as can be seen clearly in FIG. 3. The distance between the repair overlays 30 of first carriages 20 which are adjacent to one another is approximately the same or at most slightly larger than the extent of the repair overlays 30 in the longitudinal direction 5.

With the device according to the invention, a weld seam which extends in a longitudinal direction can be sealed virtually over its entire length in two working cycles. In a first working cycle, first and second carriages 20, 24 are alternately fitted onto the track, and the repair overlays 22 which are coated with adhesive are pneumatically pressed onto the wall. After the curing of the adhesive—approximately 12 hours—the receptacles 30 are moved back and the first and second carriages 20, 24 are successively removed from the guide system 6. The guide system 6 remains secured in an unchanged position to the side wall. In a second working cycle, the first carriages 20 are again provided with a repair overlay 22 which is coated with an adhesive, and the first and second carriages 20, 24 are alternately fitted, in a reverse order to that of the first working cycle, onto the track of the guide system 6 which is still secured to the side wall. The distance between the repair overlays 22 which is bonded onto the wall in the first working cycle is dimensioned such that a gap which, if appropriate, is located between adjacent repair overlays 22 in the second working cycle after the bonding of the repair overlays is covered by the adhesive which emerges laterally during the pressing-on process.

In contrast to the exemplary embodiment illustrated in FIGS. 2 to 5, planar wall surfaces or cylindrical containers or pipes can also be repaired with correspondingly structurally adapted receptacles, guide systems and repair overlays.

According to FIG. 6, a multiplicity of first carriages 202, 204 is fitted onto the track of the guide system 6, the receptacle 302, 304 of which is provided for repairing damaged areas on a planar wall surface with a planar repair overlay 220. The repair overlays 220 which are arranged on the first carriage 202 and which are arranged on receptacles 302 which extend in the longitudinal direction of the guide system 6 serve in this context for repairing weld seams which extend in a vertical direction. The carriage 204, which is illustrated in FIG. 6 and fitted onto the track on the guide system 6, supports a receptacle 304 which extends transversely with respect to the longitudinal direction 5 of the guide system 6. Accordingly, the planar repair overlay 220, which is also arranged thereon, serves to repair weld seams which run horizontally on a planar tank wall. In this exemplary embodiment, first carriages 202, 204 which are adjacent to one another are also spaced apart from one another in each case by a second carriage 24.

In FIGS. 7 and 8, the first carriages 202 and 204, respectively, are each represented in an enlarged perspective illustration.

The device according to the invention can also advantageously be used to repair an individual damaged area or damaged areas which are spaced apart from one another in the longitudinal direction of the guide system and which are located at different longitudinal positions of the guide system which is secured to the side wall with only a few suction mounts, since the reaction force which occurs when the repair overlay is pressed on is absorbed directly by the first carriage provided with suction mounts.

The invention claimed is:

1. A device for repairing a damaged area of an underwater wall region of a container or tank, comprising:
    a guide system to be mounted along a side wall, at a spacing distance from, and secured to, said side wall;
    at least one first carriage guided on said guide system, and movable in a longitudinal direction of said guide system;
    a receptacle displaceably mounted on said at least one first carriage, said receptacle being configured for holding a repair overlay to be applied with an adhesive surface to the wall region having the damaged area; and at least one suction mount disposed on said first carriage and configured for placement against the side wall and connected to a suction line, said at least one suction mount being disposed and configured for fixing said first carriage on the side wall for absorbing forces generated by applying the repair overlay to the side wall.

2. The device according to claim 1, wherein said at least one first carriage is one of at least two first carriages and comprising at least one second carriage movably mounted along said guide system and arranged in a working position between two adjacent first carriages as a space keeper.

3. The device according to claim 2, wherein a distance between said repair overlays, as defined by said second carriage, corresponds substantially to an extent of a repair overlay in the longitudinal direction.

4. The device according to claim 2, wherein said first and second carriages are driveless carriages configured to be moved exclusively by the force of gravity.

5. The device according to claim 1, wherein said at least one first carriage is a driveless carriage configured to be moved exclusively by the force of gravity.

6. The device according to claim 1, wherein said guide system is composed of sections that are detachably connected to one another.

7. The device according to claim 1, which comprises a multiplicity of suction mounts disposed on said guide system and connected to a suction line for securing said guide system to the side wall.

8. The device according to claim 1, configured for repairing a wall region of a tank in a nuclear reactor installation.

* * * * *